(12) United States Patent
Shank et al.

(10) Patent No.: US 8,123,148 B2
(45) Date of Patent: *Feb. 28, 2012

(54) VEHICLE WINDSHIELD CLEANING SYSTEM

(75) Inventors: David Shank, Hershey, MI (US); John Washeleski, Cadillac, MI (US); Peter Strom, Big Rapids, MI (US); Thomas Gronski, Grand Blanc, MI (US)

(73) Assignee: SBR Investments Company LLC, Reed City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,298

(22) Filed: Nov. 9, 2010

(65) Prior Publication Data

US 2011/0056986 A1 Mar. 10, 2011

Related U.S. Application Data

(60) Division of application No. 11/928,738, filed on Oct. 30, 2007, now Pat. No. 7,857,238, which is a continuation-in-part of application No. 11/341,116, filed on Jan. 27, 2006, now Pat. No. 7,588,194, which is a continuation-in-part of application No. 10/894,266, filed on Jul. 19, 2004, now Pat. No. 7,641,131, which is a continuation-in-part of application No. 10/653,827, filed on Sep. 3, 2003, now Pat. No. 6,902,118, which is a continuation-in-part of application No. 10/269,647, filed on Oct. 11, 2002, now Pat. No. 6,851,624.

(60) Provisional application No. 60/952,036, filed on Jul. 26, 2007, provisional application No. 60/551,571, filed on Mar. 9, 2004, provisional application No. 60/415,552, filed on Oct. 2, 2002.

(51) Int. Cl.
*B05B 17/04* (2006.01)
*B05B 1/24* (2006.01)
*B05B 1/10* (2006.01)
*B60S 1/50* (2006.01)
*B60S 1/48* (2006.01)
*B60S 1/46* (2006.01)

(52) U.S. Cl. ........ 239/13; 239/130; 239/135; 239/284.1

(58) Field of Classification Search .................... 239/13, 239/128, 130, 135, 284.1, 284.2; 165/41, 165/202, 287–294

See application file for complete search history.

(56) References Cited

U.S. PATENT DOCUMENTS 4,090,668 A 5/1978 Kochenour
(Continued)

FOREIGN PATENT DOCUMENTS

EP 0219126 A2 4/1987
(Continued)

OTHER PUBLICATIONS

International Search Report and Written Opinion (8 pages) for International Application No. PCT/US08/07878, mailing date Sep. 29, 2008.

(Continued)

*Primary Examiner* — Darren W Gorman
(74) *Attorney, Agent, or Firm* — Tarolli, Sundheim, Covell & Tummino LLP

(57) ABSTRACT

Apparatus and method for providing a heated cleaning fluid to a vehicle surface. The apparatus has an inlet port for receiving an amount of fluid; an outlet port for dispensing an amount of heated fluid two glow plug heating elements and a control for activating or energizing the glow plugs to heat fluid within a reservoir.

2 Claims, 12 Drawing Sheets

U.S. PATENT DOCUMENTS

| | | | |
|---|---|---|---|
| 4,233,494 | A | 11/1980 | Pawlik et al. |
| 4,508,957 | A | 4/1985 | Rocchitelli |
| 5,012,977 | A | 5/1991 | Karklins et al. |
| 5,354,965 | A | 10/1994 | Lee |
| 5,509,606 | A | 4/1996 | Breithaupt et al. |
| 5,927,608 | A | 7/1999 | Scorsiroli |
| 5,957,384 | A | 9/1999 | Lansinger |
| 6,029,908 | A | 2/2000 | Petzold |
| 6,032,324 | A | 3/2000 | Lansinger |
| 6,133,546 | A | 10/2000 | Bains |
| 6,164,564 | A | 12/2000 | Franco et al. |
| 6,257,500 | B1 | 7/2001 | Petzold et al. |
| 6,364,010 | B1 | 4/2002 | Richman et al. |
| 6,465,765 | B2 | 10/2002 | Katayama et al. |
| 6,601,776 | B1 | 8/2003 | Oljaca et al. |
| 6,615,438 | B1 | 9/2003 | Franco et al. |
| 6,669,109 | B2 | 12/2003 | Ivanov et al. |
| 6,892,417 | B2 | 5/2005 | Franco et al. |
| 6,952,524 | B2 | 10/2005 | Bissonnette et al. |
| 7,108,754 | B2 | 9/2006 | Franco et al. |
| 7,128,136 | B2 | 10/2006 | Gregory |
| 2002/0137455 | A1 | 9/2002 | Ivanov et al. |
| 2003/0042328 | A1 | 3/2003 | Wojan et al. |
| 2003/0141381 | A1 | 7/2003 | Bissonnette |
| 2003/0222156 | A1 | 12/2003 | Bissonnette |
| 2004/0170411 | A1 | 9/2004 | Kuebler et al. |
| 2004/0197094 | A1 | 10/2004 | Amberg |
| 2004/0226127 | A1 | 11/2004 | Kaplan |
| 2005/0083638 | A1 | 4/2005 | Warren et al. |
| 2006/0196448 | A1 | 9/2006 | Hayworth et al. |

FOREIGN PATENT DOCUMENTS

| | | |
|---|---|---|
| EP | 1213197 A | 6/2002 |
| FR | 2763549 A | 11/1998 |
| GB | 2253339 A | 9/1992 |
| WO | WO98/58826 A | 12/1998 |
| WO | WO02/092237 A | 11/2002 |

OTHER PUBLICATIONS

Jacobs Electronics Safe-Vue Heater Brochure, pp. 1-4, at least as early as Jun. 28, 2002.

1 page Valeo OPTI-Wash spec sheet, date unknown.

3 page website, www.aaro.ca/BreakingNews/Sep26-Oct17-01NwsBfs.html, posted Oct. 1, 2001.

4 page installation and owner's manual, SAFE-VUE HEATER, kit # 250-6652, Rostra Precision Controls, Inc. (1999).

1 page website, www.buyhotshot.com/choos.asp?ins=2 (Jan. 2003).

4 page website, www.buyhotshot.com/faq.asp?ins=8, (Jan. 2003).

Bennett, "Hot water clears icy windshields," 2 pages, Free Press, date unknown.

2 page website, www.theautochannel.com/news/2001/09/20-29185/html, "Valeo Maximizes Driver Visibility with OPTI-Wash Heated Wash System" (Jun. 2003).

1 page website, www.ai-online.com/issues/article_detail.asp?id=22, (Jun. 2003).

VEHICLE WINDSHIELD CLEANING SYSTEM

RELATE BACK

The present application is a divisional application claiming priority from pending U.S. patent application Ser. No. 11/928,738 entitled "Vehicle Windshield Cleaning System" and also claims priority from provisional application Ser. No. 60/952,036 and is a continuation in part of co-pending application Ser. No. 11/341,116 filed Jan. 27, 2006 which is a continuation in part of application Ser. No. 10/894,266, filed Jul. 19, 2004 (claiming priority from provisional application 60/551,571), which is a continuation in part of application ser. No. 10/653,827 filed on Sep. 3, 2003, now U.S. Pat. No. 6,902,118 which is a continuation in part of U.S. Ser. No. 10/269,647 filed Oct. 11, 2002 (claiming priority from U.S. provisional application 60/415,552), now U.S. Pat. No. 6,851,624, all of which are incorporated herein by reference and from which priority is claimed.

The present application claims priority from provisional application Ser. No. 60/952,036 and is a continuation in part of co-pending application Ser. No. 11/341,116 filed Jan. 27, 2006 which is a continuation in part of application Ser. No. 10/894,266, filed Jul. 19, 2004 (claiming priority from provisional application 60/551,571), which is a continuation in part of application Ser. No. 10/653,827 filed on Sep. 3, 2003, now U.S. Pat. No. 6,902,118 which is a continuation in part of U.S. Ser. No. 10/269,647 filed Oct. 11, 2002 (claiming priority from U.S. provisional application 60/415,552), now U.S. Pat. No. 6,851,624, all of which are incorporated herein by reference and from which priority is claimed.

FIELD OF THE INVENTION

The present invention concerns a windshield cleaning system, and more particularly to a windshield cleaning system that heats cleaning fluid applied to the windshield.

BACKGROUND ART

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc, and utilizes the heat from the engine coolant to elevate the temperature of the washer fluid. U.S. Pat. Nos. 5,957,384 and 6,032,324 also concern de-icing of a windshield.

SUMMARY OF THE INVENTION

The invention concerns apparatus and method for providing a large amount of heated cleaning fluid to a vehicle surface. An exemplary system has an inlet port for receiving an amount of fluid; an outlet port for dispensing an amount of heated fluid; a heating element that heats up fluid passing from the inlet to the outlet; and a control circuit for energizing the heating element with a voltage to heat the fluid passing from the inlet to the outlet.

In one exemplary embodiment, the system provides heated cleaning fluid to a vehicle surface and includes structure defining an inlet port for receiving an amount of fluid, an outlet port in fluid communication with a reservoir for dispensing an amount of heated fluid.

These and other objects advantages and features of the invention will become better understood from the following detailed description of one exemplary embodiment of the present invention which is described in conjunction with the accompanying drawings.

EXEMPLARY EMBODIMENT FOR PRACTICING THE INVENTION

The drawings depict embodiments of the present invention that concern a washer control system 10 for use with a vehicle. In the disclosed exemplary embodiments of the invention, the control system 10 is used in conjunction with a windshield washer apparatus. The control system 10 includes a control circuit 14 that includes an electronic output drive signal circuit 20 and an input signal interpretation or conditioning circuit 16.

Figure 2:
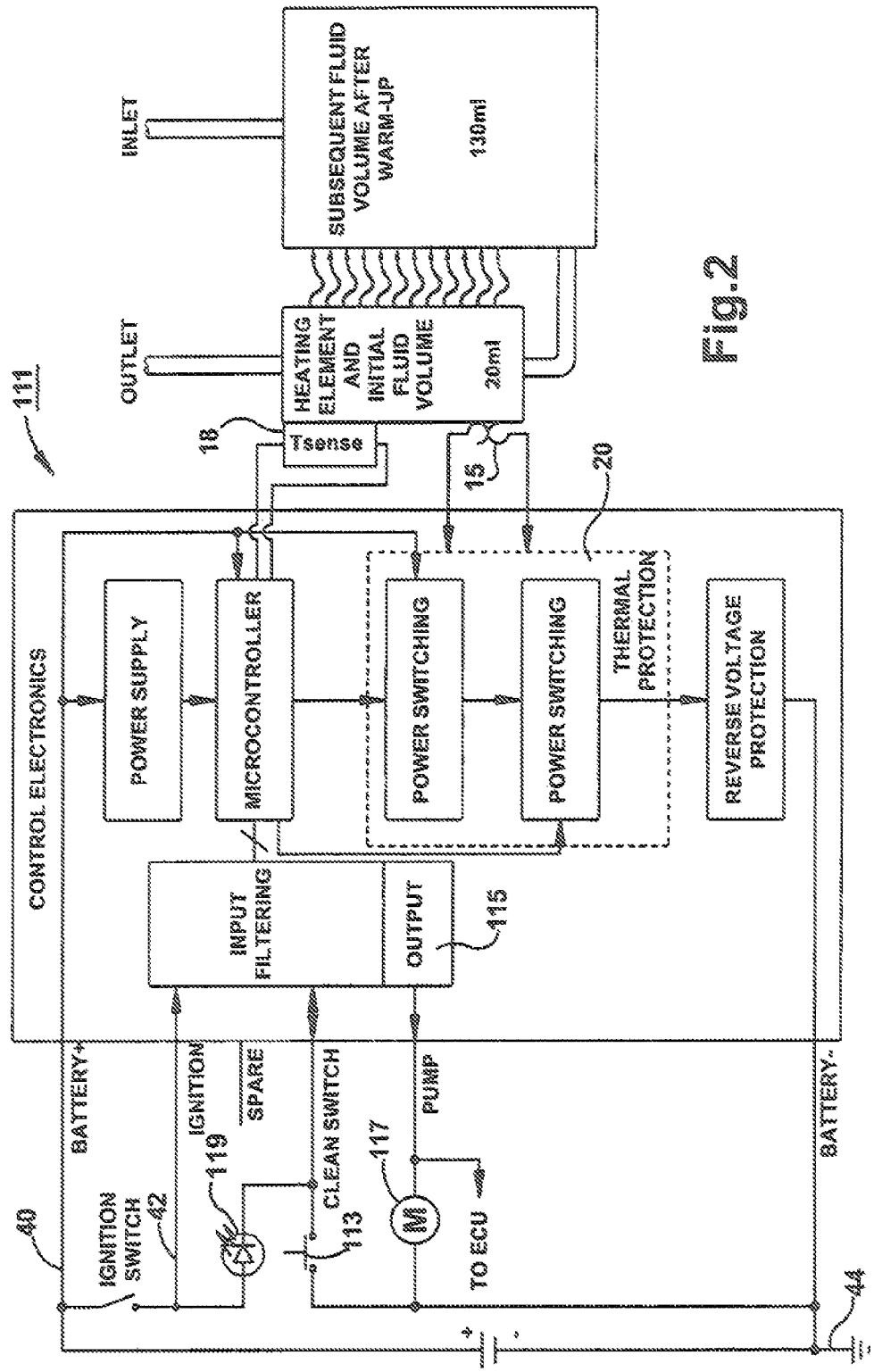
FIG. 2 is an alternate block diagram schematic of a representative system for use with the present invention.

The input signal interpretation circuit 16 electronically interfaces with at least one temperature sensor 18. In one embodiment of the invention, the temperature sensor provides signals related to the temperature of washer fluid supplied to windshield spray nozzles on the vehicle. In one embodiment of the invention, the control system also includes an electronic output circuit that drives an output power control for at least one heating element that heats the windshield washer fluid. One exemplary control system could have both "high side" and "low side" type drives working together as illustrated in FIG. 2. An alternate control system is a "low side" type drive, meaning the module activates and deactivates the heater element by controlling the electrical circuit path to ground. Another alternate control system could have an output drive that is a "high side" type, meaning the module activates and deactivates the heater element by controlling the electrical circuit path to a power source. In accordance with another alternate control system, an electrical interface coupled to a vehicular communication bus allows the control system to be controlled by vehicle communications and makes data available to the vehicle for operation and diagnostics of the control system.

The control circuit 14 includes a programmable controller or microprocessor 14a that implements control algorithms for washer heater control output functions in response to vehicle input signals. As seen in the functional schematic of FIG. 1, the control system 10 includes an electronic output 12 from the control circuit 14 for providing controlled current to the heating element 30. Heating element 30 may be composed of a single heating element or multiple heating elements. By selecting heater current draw and power rating the heating time and total system current draw can be modified over a wide range of operating parameters based on individual vehicle requirements, ie. electrical power available. The control circuit 14 also includes an input signal interpretation circuit 16, or interface, to monitor input signals from, as one example, the temperature sensor 18. The temperature sensor 18 provides signals that allow for control of the amount of power delivered to the heating element 30. The controller monitors inputs from a vehicle battery 40 and vehicle ignition 42. It is understood that a separate ignition input 42 may not be required if all power is obtained from the battery input 40. In accordance with another alternate embodiment as illustrated in the functional schematic of FIG. 2, the controller also monitors a user input and drives a vehicle washer fluid pump 45a (FIG. 8) having a pump motor.

Figure 8:
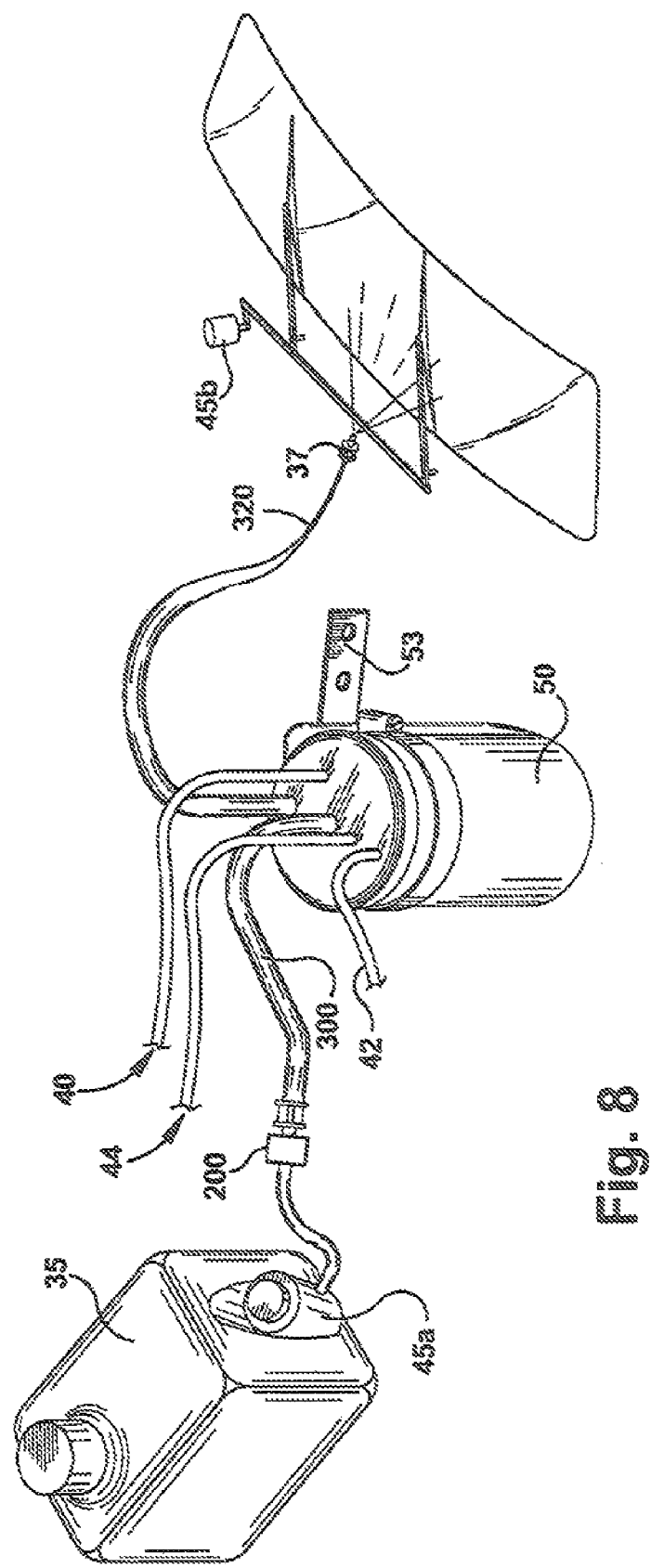
FIG. 8 is a perspective view of a heating assembly coupled to a fluid pump.
Figure 9:
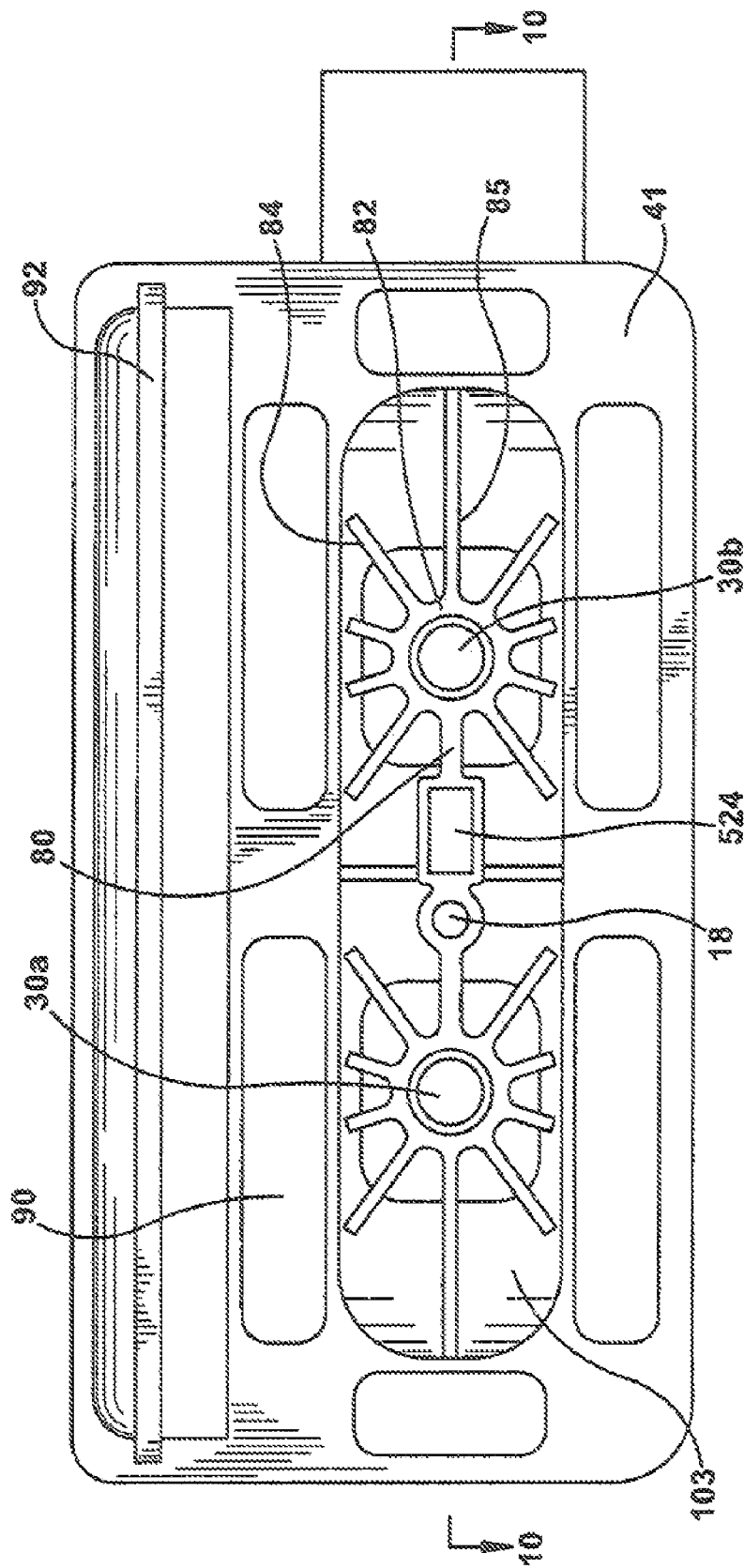
FIG. 9 is a plan view of an exemplary heating canister constructed in accordance with the invention.
Figure 10:
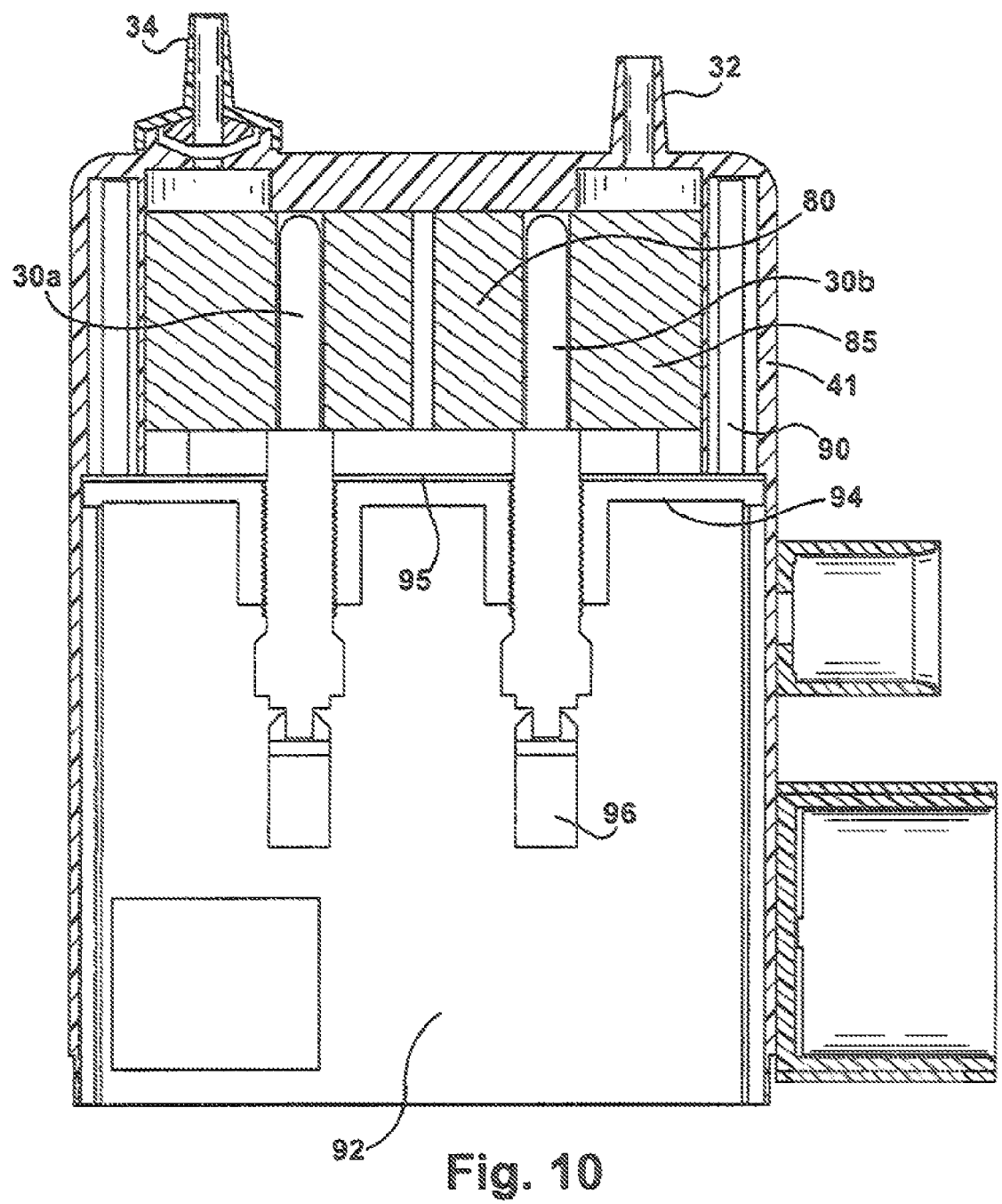
FIG. 10 is a view as seen from the line 10-10 in FIG. 9.

In one exemplary embodiment, the electronic output circuit 20 controls power coupled to a heater element 30 (FIG. 1) that includes two glow plugs 30a, 30b (FIG. 10), or other heating element equivalents such as nichrome wire, ceramic heaters, or any metallic or non-metallic type heater mounted in thermal contact with a heat exchanger 80 as shown in FIGS. 9 and 10. Fluid is routed past the heat exchanger 80 in thermal contact with these elements by routing fluid into an inlet 32 and forcing the fluid out an outlet 34 having a check valve to prevent fluid leaving the outlet 34 from re-entering a fluid reservoir 103. The checkvalve could be positioned on the inlet 32. The inlet receives washer fluid from a fluid reservoir 35 (FIG. 8) of a motor vehicle and the outlet 34 delivers heated washer fluid to nozzles 37 (FIG. 8) mounted to the vehicle which direct the washer fluid against the vehicle surface, typically a windshield, headlamps etc. In the exemplary embodiment the heating elements 30a, 30b are glow plugs. FIGS. 9 and 10 depict an exemplary embodiment of a housing 41 that defines a fluid reservoir 103 that surrounds the heat sinks. The housing 41 is constructed from plastic, or other material with favorable thermal characteristics.

The programmable controller 14 (FIG. 1) constructed in accordance with the exemplary embodiment of the invention implements control algorithms for washer heater control output functions in response to vehicle input signals. As washer fluid temperature changes due to ambient temperature changes, battery voltage changes, and the like, the duration of applied heat is increased or decreased in order to maintain a washer fluid at or near a target temperature. Control of the heating may also include redundant failsafe mechanisms such as a thermal fuse 524 (FIG. 9).

Controller Schematics

Figure 1:
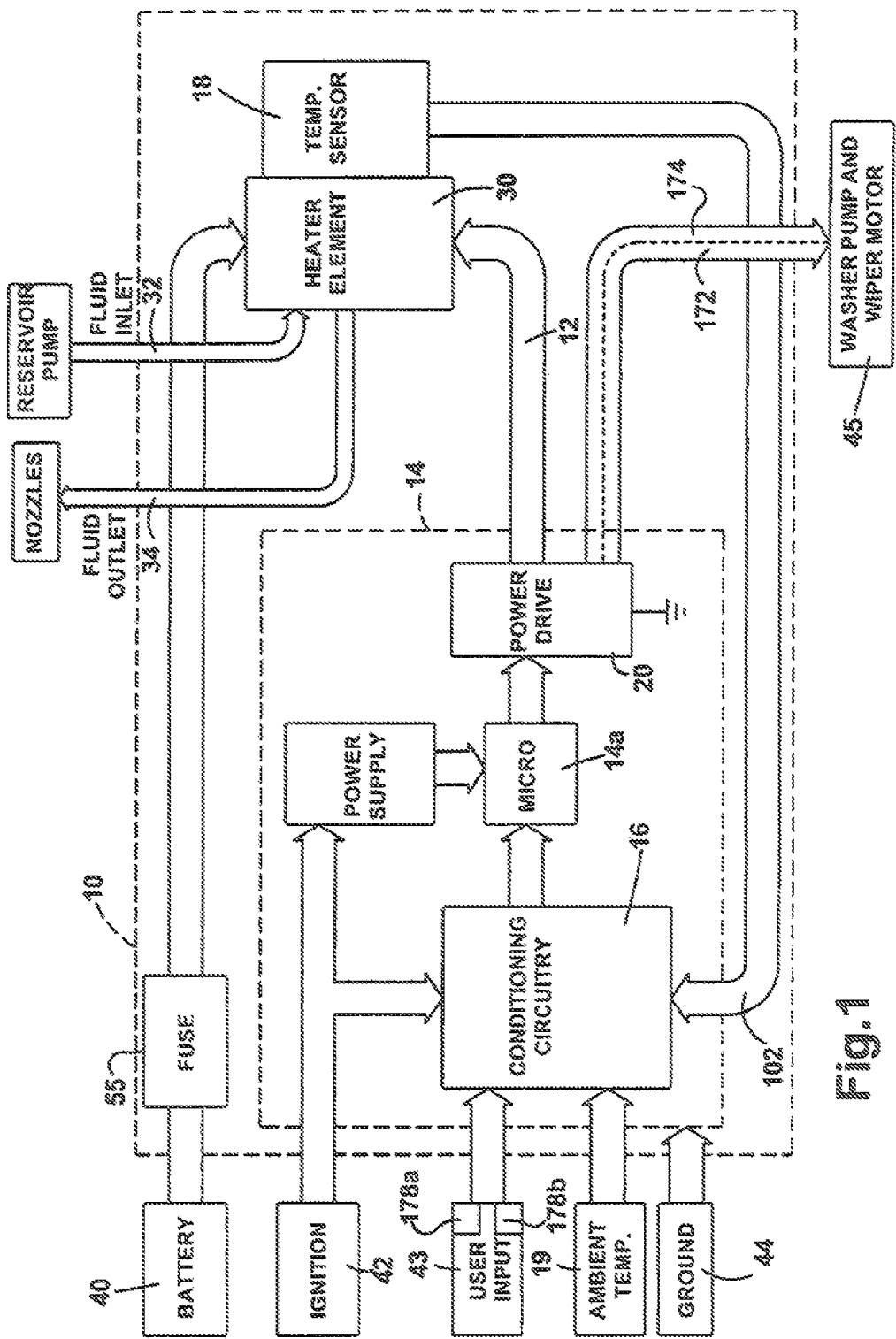
FIG. 1 is a block diagram schematic of a representative system for use with the present invention.
Figure 4:
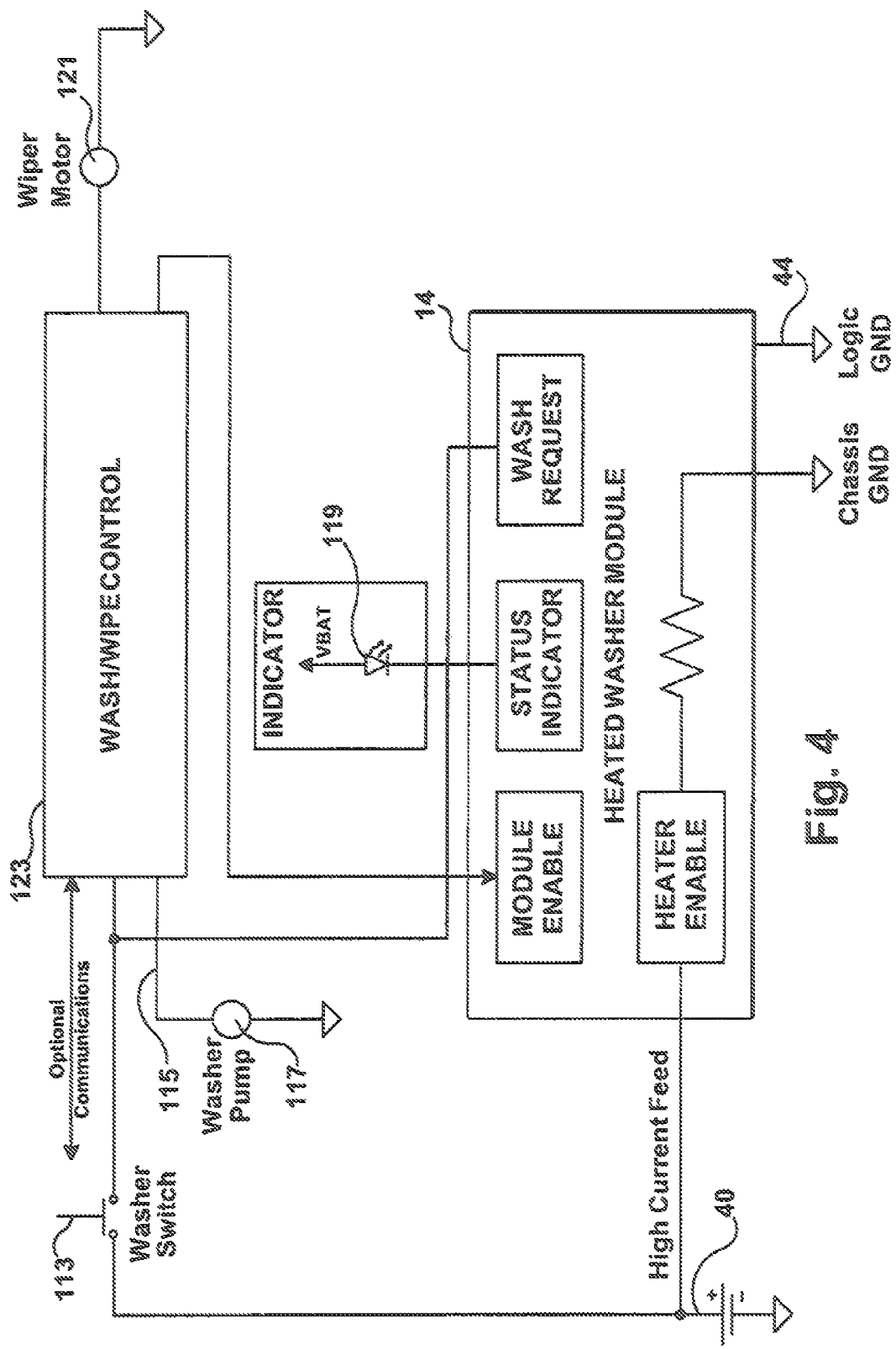
FIGS. 4-7 are schematic depictions of control circuits for use with a washer control system constructed according to an alternative embodiment of the present invention.

The block diagram shown in FIG. 1 and the more detailed schematic of FIG. 4 depict operation of a control system 10 having external electrical connections, which include Battery 40, Ground 44, and Ignition 42. The system block diagram 111 shown in FIG. 2 shows further external electrical connections including a user operated Clean Switch 113 and an output 115 to drive a vehicle washer pump motor. The Battery input connection 40 provides the voltage supply needed by the control system 10. This connection allows the high current flow required by the heating element. The Ground connection 44 provides the current return path to the battery negative terminal. This ground connection allows the high current flow required by the heating element plus the requirement of the control system 10. An Ignition input 42 provides power to the controller. It is understood that separate ignition input 42 may not be required if all power is obtained from battery input 40. The battery voltage is monitored by the controller 14 to determine if there is sufficient voltage present to allow the control system to operate.

The input 102 from the temperature sensor 18 in physical contact with the heat exchanger 80 is directly related to washer fluid temperature. Washer fluid temperature is monitored by using a temperature sensor such as a thermistor, RTD, or the like. The washer fluid is monitored non-invasively by attaching the temperature sensor to the heater. Alternatively, the fluid temperature could be monitored invasively by placing a temperature sensor directly into the fluid through a threaded fitting or other suitable attachment method.

Operation

Figure 3:
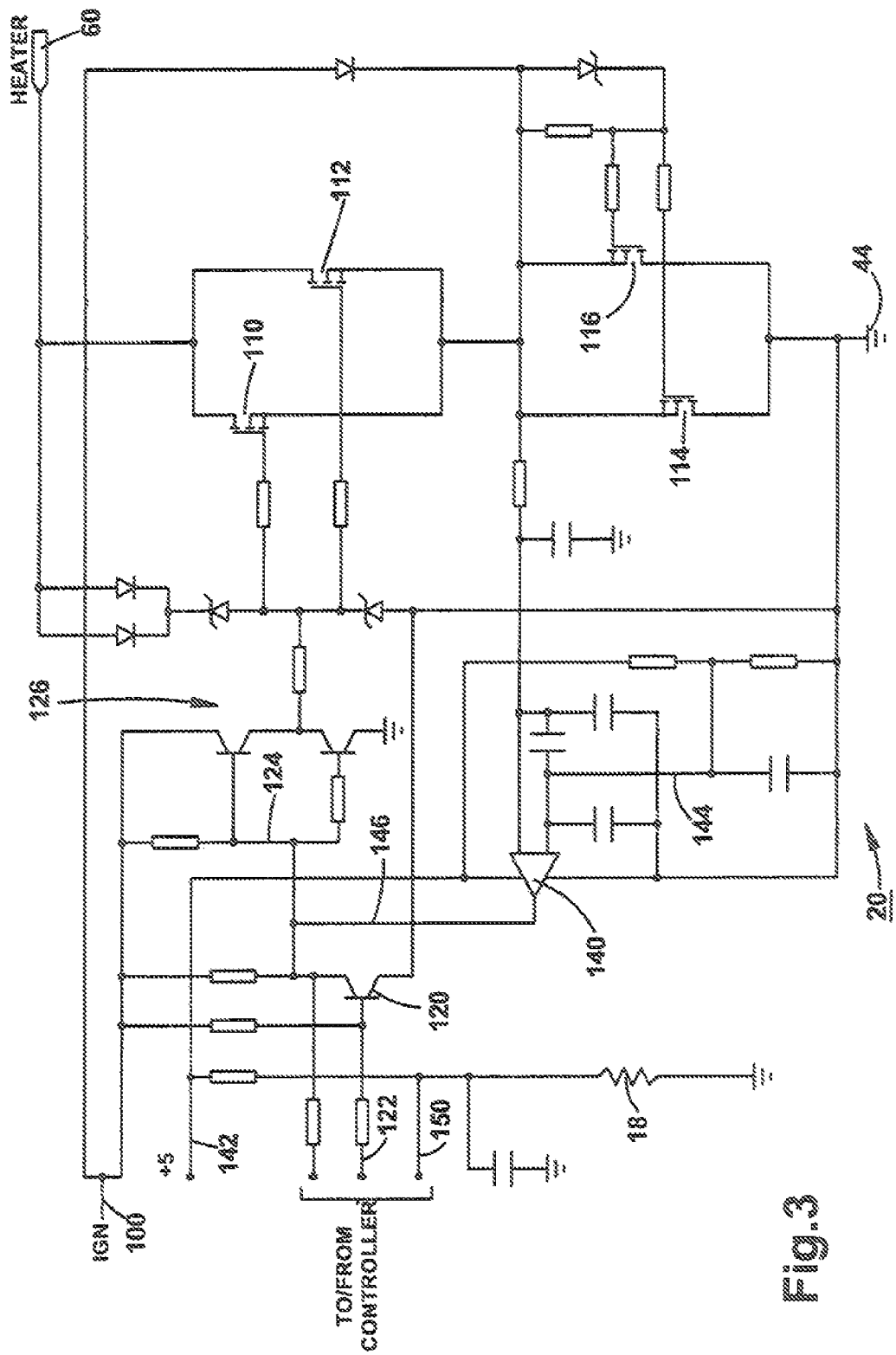
FIG. 3 is a schematic diagram of a drive circuit coupled to a fluid heating element that forms part of the FIG. 2 system.

The controller receives a wake-up command signal from the Ignition input 100 (FIG. 3). When the Ignition input is above a predetermined voltage, the controller 14 drives the heater element 30 if the following are true:

1. The ignition voltage is greater than a first predetermined level and less than a second predetermined level.
2. The sensed Heater element temperature is less than a predetermined level.

Cleaning the windshield with warmed fluid can be accomplished by the following:

a. Application of ignition 42 will cause the unit to heat the volume of fluid. During the heating time an indicator LED 119 flashes. Alternately, the LED could remain off until the fluid has been heated at which time the LED will turn on either 100% or flashing. The LED is shown as part of the clean switch 113, but a skilled artisan could move the indicator external to the switch.

b. During heating of the fluid if the clean switch 113 is pressed, the LED will begin flashing to confirm the operator's desire to use smart mode. If heating has already completed and the indicator lamp is illuminated (not flashing), momentarily activating the clean switch 113, initiates a smart mode consisting of the energization of a washer pump and wiper motor. During heating c. Output 115 activates the washer pump 117 to dispense fluid on the windshield. In the embodiment shown in FIG. 4, an external controller 123 activates a wiper motor 121 in response to a signal from the washer switch 113. One skilled in the art could have the same controller 14 activate the wiper motor 121 and the washer pump 117.

d. Hot fluid will be sprayed on the windshield and the windshield wipers will cycle automatically, when the hot fluid reduces to a predetermined temperature or time, output 115 deactivates, thus completing the smart mode and washer spray/wiper cycling will halt. Momentarily pressing clean switch 113 during the smart mode will cancel the operation. The cleaning switch can be configured to heat fluid to a predetermined temperature (or time) and dispense and reheat and dispense fluid multiple times.

2. With ignition 42 applied and when indicator 119 is illuminated (not flashing) indicating warm fluid is available, the activation of the existing vehicle wash switch will dispense fluid for as long as the switch is closed for on-demand cleaning.

3. The activation of the existing vehicle wash switch will dispense fluid for as long as the switch is closed for on-demand cleaning regardless of fluid temperature.

An output driver 20 depicted in FIG. 1 and FIG. 2 applies power to the heater after starting the heating cycle. The output driver will then begin applying power to the heater to maintain the temperature of the fluid. A fuse 55 is located between the battery connection and the heater element external to the housing 50 in the illustrated embodiment as shown in FIG. 8. An alternative embodiment could have the fuse 55 internal to the housing as shown in FIG. 1. In the exemplary embodiment of the invention, the desired heater temperature is predetermined to be in a range between 120 and 150 degrees Fahrenheit. Placing the temperature sensor 18 in physical contact with the heating element and maintaining the heater temperature at a temperature at or below 150 degrees Fahrenheit prevents the heating element from heating the cleaning fluid to an undesirable temperature, such as boiling. This helps prevent the formation of mineral deposits that could potentially clog the nozzle 37 (FIG. 8). As depicted in FIG. 9 if the temperature sensor 18 is not mounted directly on the heating element, but is rather located in the fluid reservoir 103, only an approximate, latent measurement of the heating element temperature is sensed. This would allow the heat exchanger 80 to heat to a temperature that is hotter than the desired fluid temperature in reservoir 103 and potentially cause the formation of nozzle clogging mineral deposits. The output driver 20 (FIGS. 1, 2) will remain active as long as the ignition voltage is above a predetermined voltage and the heater temperature is below the desired heater temperature as determined by the temperature sensor 18. When the ignition 42 is turned off, the controller is deactivated.

FIG. 3 depicts one implementation of the output circuit 20. A heater connection 60 is shown in the upper right hand portion of the FIG. 3 depiction. This connection is grounded by means of initiating conduction of two power Field Effect Transistors (FET) 110, 112 which provide a current path to ground from the heater connection 60 to the ground connection 44 through a pair of reverse polarity protection FET transistors 114, 116. The two transistors 110, 112 are turned on or rendered conductive by means of a pre-drive transistor 120 that is coupled to an output 122 from the microprocessor controller 14a (FIG. 1). First consider a high signal from the controller 14a at this output 122. This turns on transistor 120 that pulls an input 124 of a totem pole transistor combination 126 low. This signal turns on a lower of the two transistors of the totem pole combination to send an activation signal that turns off the two FETs 110, 112.

When the controller provides a low output from the controller 14a at the output 122, the transistor 120 turns off and pulls an input 124 to a totem pole transistor combination 126 high. This signal turns on an uppermost of the two transistors of the totem pole combination to send an activation signal that turns on the two FETs 110, 112.

In the illustrated embodiment, a comparator 140 monitors current through the transistors 114, 116 (and by inference the transistors 110, 112) and deactivates the transistors in the event too high a current is sensed. A five volt signal that is supplied at an input 142 from a power supply (FIG. 1) provides a reference input 144 to the comparator 140. When the non-reference input exceeds the reference input due to a rise in the current through the transistors 110, 112 (and associated rise in the voltage across the transistors 114, 116) the output 146 of the comparator goes low and removes the input from the gate of the FETs 110, 112 that causes them to conduct. This low signal at the output 146 is also coupled to the controller so that the controller can respond to the over current condition.

In accordance with the exemplary embodiment of the invention a thermistor temperature sensor 18 is also coupled to the controller. A signal at a junction between the temperature sensor 18 and a resistor coupled to the five volt input 142 generates a signal at an input 150 related to the temperature of the heater element 30 (FIG. 1).

Referring to FIG. 9, in one embodiment, the control circuit 14 is mounted to a printed circuit board 92 supported by a housing 41. As seen in FIG. 3, a connector 60 is a bent metallic member that attaches to the heating element 30 in the vicinity of the printed circuit board 92 and is in physical contact with the circuit components on the printed circuit board. The connector 60 thereby not only acts as a path to ground for current passing through the heating element 30 but acts as a heat sink that transmits heat away from the printed circuit board.

The exemplary control circuit includes a microcontroller as shown in FIG. 1 running at an internal clock frequency of 4.0 Megahertz. In the exemplary embodiment, the microcontroller 14a selectively energizes the heating element 30 based on a voltage applied to the control circuit. This voltage may be the battery voltage 40 and/or the ignition voltage 42. When the ignition input voltage is applied, the control circuit will power up, come out of reset, and wait for a start delay time imposed by the controller to allow the vehicle's electrical system to become stable. After this start delay, the control circuit monitors the ignition voltage to determine if the ignition is above a minimum enable voltage. A temperature signal from the sensor 18 is also monitored to see if the temperature of the fluid is below a set point temperature. An output drive feedback signal is also monitored to ensure that the output is in the correct state. If all conditions are such that the output can be enabled, the output 122 (FIG. 3) to the transistor 120 is pulled low. This initiates fluid heating. Initially, the output drive is on 100% for a maximum on time or until the feedback temperature reading approaches a set point temperature. In one embodiment, a preset maximum on time is empirically derived to stay below the boiling point of the cleaning fluid. Subsequently the control will read the heating element 30 temperature and make a determination if power should be reapplied. If the sensed temperature is below the desired setpoint, the output will be re-enabled at a variable duty cycle so that the heating element 30 is heated to the setpoint goal temperature as quickly as possible without exceeding a maximum allowable overshoot temperature.

Normal operation consists of maintaining the fluid temperature at the desired setpoint temperature by varying the duty cycle at which voltage is applied across the heating element 30. The output duty cycle changes based on how far the sensed temperature is below the set point temperature.

In the event of excessive current flow through the power drive 20, the output 12 will automatically be disabled. In this event the signal at the output 146 from the comparator 140 (FIG. 3) will go low. When this occurs the controller 14a disables the output to the transistor 120 for a period of time equal to an output retry rate programmed into the controller 14a. If the fault condition is removed, normal operation of the temperature set point control is re-instituted. An alternate embodiment could have the current sense capability implemented by the comparator 140 omitted.

In the event the operating voltage from the battery (and ignition) is too high or too low ($\geq 16.5$ and $\leq 8$ volts respectively) the controller 14a disables the output 12 for a timeout period. After the timeout period, if voltage conditions are within normal parameters, the controller again enables the output. It is understood that the operating voltage range can be set to whatever voltages are required for a particular application. The exemplary system also incorporates a soft turn-on and turn-off of the heating element. The soft turn-on and turn-off is accomplished by a slow ramp up or down of the output 20 that drives the heating element. The ramping of power reduces the amount of flickering that can be observed from the vehicle headlights. It is recognized that the FET drivers could be run linearly to accomplish the soft turn-on and turn-off of the heating element. It is also recognized that the FET drivers could be run linearly to regulate the temperature of the heating element. It is further recognized that if the FET drivers are run linearly they will produce quantities of heat that will aid in the heating of fluid in the system.

Figure 5:
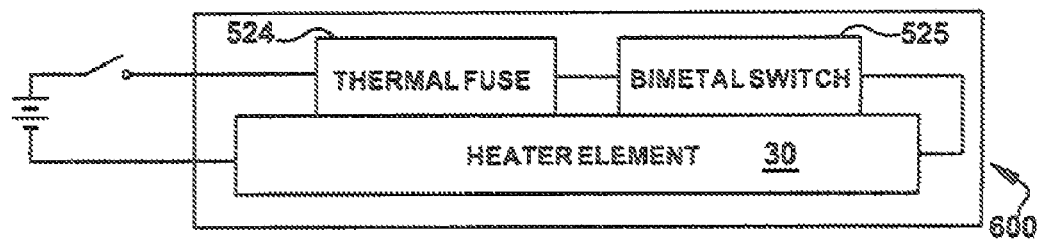
Figure 6:
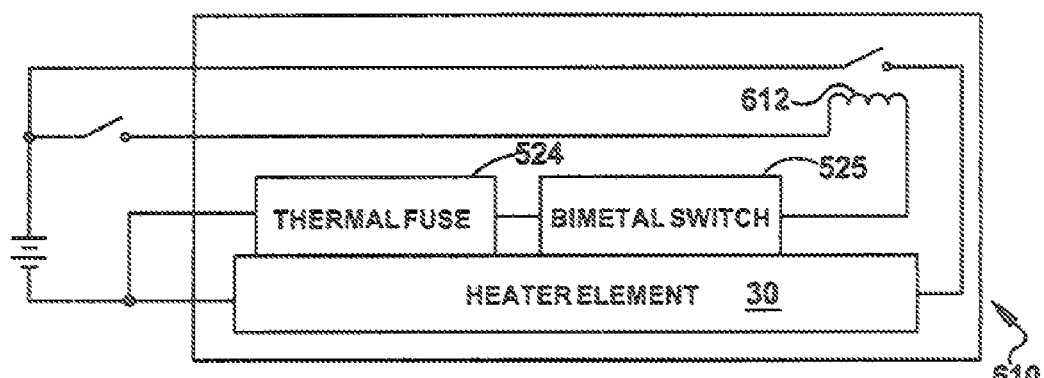

FIGS. 5 and 6 illustrate an embodiment of a washer control system 10 that is different from that described previously due to the replacement of control circuit 14 with a thermal fuse device 524 and a bi-metal device 525. FIG. 5 is a schematic depiction of such a control circuit. The thermal fuse 524 prevents the washer control system 10 from overheating, while the bi-metal device 525 regulates heating during operation. The bi-metal device could control a relay 612 (see control circuit schematic of FIG. 6) that supplies power to the heating element. In addition, at least one temperature sensor could be used in conjunction with a reference to control a relay that supplies power to the heating element.

Figure 7:
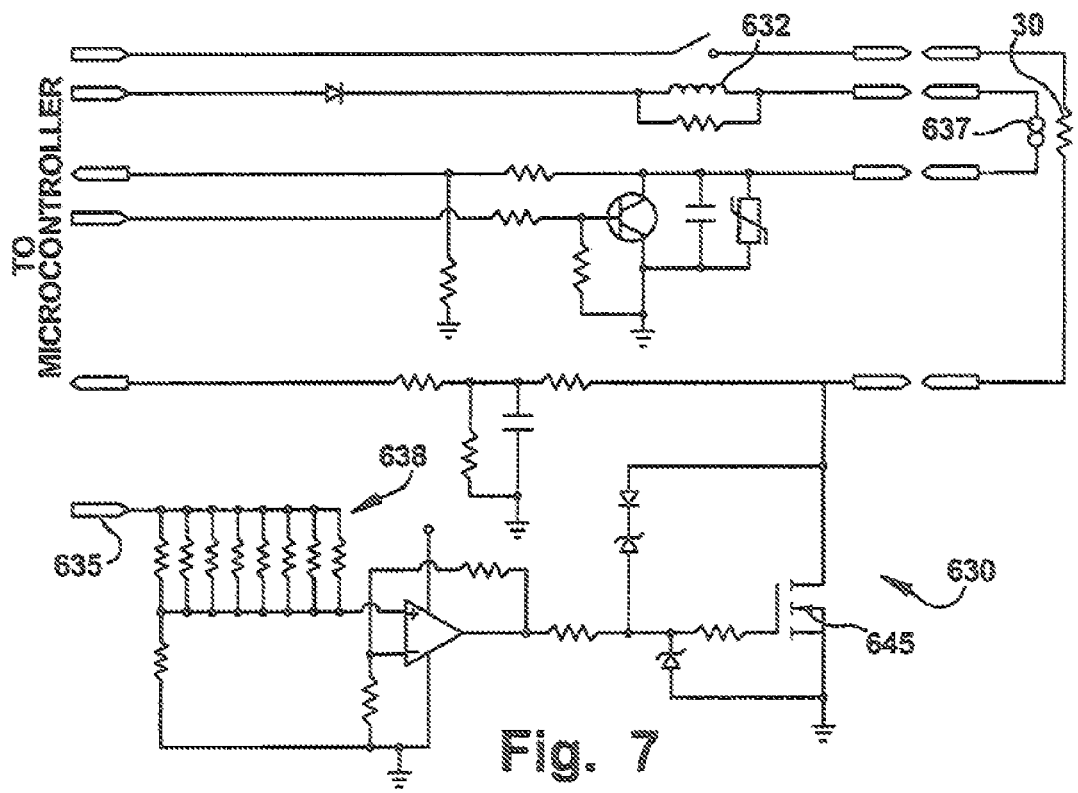

In FIG. 7, the heater 30 is energized with battery voltage by a relay 632 that is activated by ignition of the vehicle. A thermal fuse 637 is in series with the relay coil and is in proximity to the heater 30. If the heater becomes too hot, the thermal fuse 637 will open and voltage is removed from the heater. The control circuit 14 shown in FIG. 1 provides a digital signal to a heater energization circuit 630 shown in FIG. 7. A digital signal 635 from the controller is converted to an analog voltage by a converter circuit 638. The converted voltage is provided to a FET 645 as a gate voltage. The gate voltage varies between zero to a FET saturation voltage. The FET 645 is part of a current path for the heater 30 and dissipates an amount of heat that is proportional to the driving voltage that is supplied to it. Since battery voltage is monitored, and the resistance of the heater is known, current flowing through the heater can be calculated by the control circuit 14 to set and regulate the gate voltage. By controlling the relative amounts of power dissipated in the FET and heater, the control circuit can apply varying amounts of current to maintain a desired fluid temperature. By controlling the rate of rise and fall a soft turn an/off can be achieved.

FIGS. 9 and 10 illustrate an exemplary fluid heating assembly that provides a heated cleaning fluid to a vehicle surface. A plastic housing 41 defines an interior reservoir 103 and including an inlet port 32 for routing fluid into the reservoir from an external source. The housing further defining an outlet port 34 in fluid communication with the reservoir for dispensing an amount of heated fluid to a nozzle for spraying heated fluid from the reservoir onto a surface such as a windshield.

An aluminum heat exchanger 80 has struts 85 of a length to be supported by the plastic housing in a position that is at least partially covered by fluid within the reservoir 103. First and second transversely spaced generally circular hub segments 82 are coupled together by an intermediate bridging segment. Each hub supports multiple fins 84 that extend outwardly from its associated hub to increase the surface area of the heat exchanger and promote heat transfer to the fluid in the reservoir. The heat exchanger may also be made out of other thermal or reaction with fluids. In the preferred embodiment it is a PTFE penetrated hardcoat anodization.

First and second glow plug heater elements include first and second glow plugs 30a, 30b for heating fluid that passes from the inlet 32 to the outlet port 34 through the reservoir 103 in contact with the heat exchanger 80. The glow plug heater elements axially extend into the hubs of the heat exchanger so that heat emitting surfaces of the glow plugs (NSN: 2920-01-188-3863) are bonded to interior curved surfaces of the hubs by a thermally conductive material to transmit heat to the heat exchanger. The glow plug heating elements are coupled at one end with generally conductive connector plates 96 for routing energizing signals to the glow plugs.

A control circuit supported by a printed circuit board 92 supported by the housing energizes the glow plugs with a voltage and thereby heats fluid passing from the inlet to the outlet through the reservoir. A plastic wall member 94 supported within the housing and has openings for accommodating corresponding first and second glow plugs. A seal 95 contacts the wall member and confines fluid to the reservoir by preventing fluid from leaking outward from the reservoir past the wall member. Air pockets 90 formed in the housing 41 surround the heat exchanger and provide insulation between the heat exchanger an the region outside the housing. These pockets also serve as freeze protection in the event water is frozen in the device. These air chambers allow the reservoir to expand with the freezing water. For optimal protection these chambers may be filled with a compressible material to control the freeze expansion performance. The air pockets 90 may be positioned to cover only a portion of the housing 41. Connectors route battery, ground and control signals to the control circuit mounted to the printed circuit board.

Figure 14:
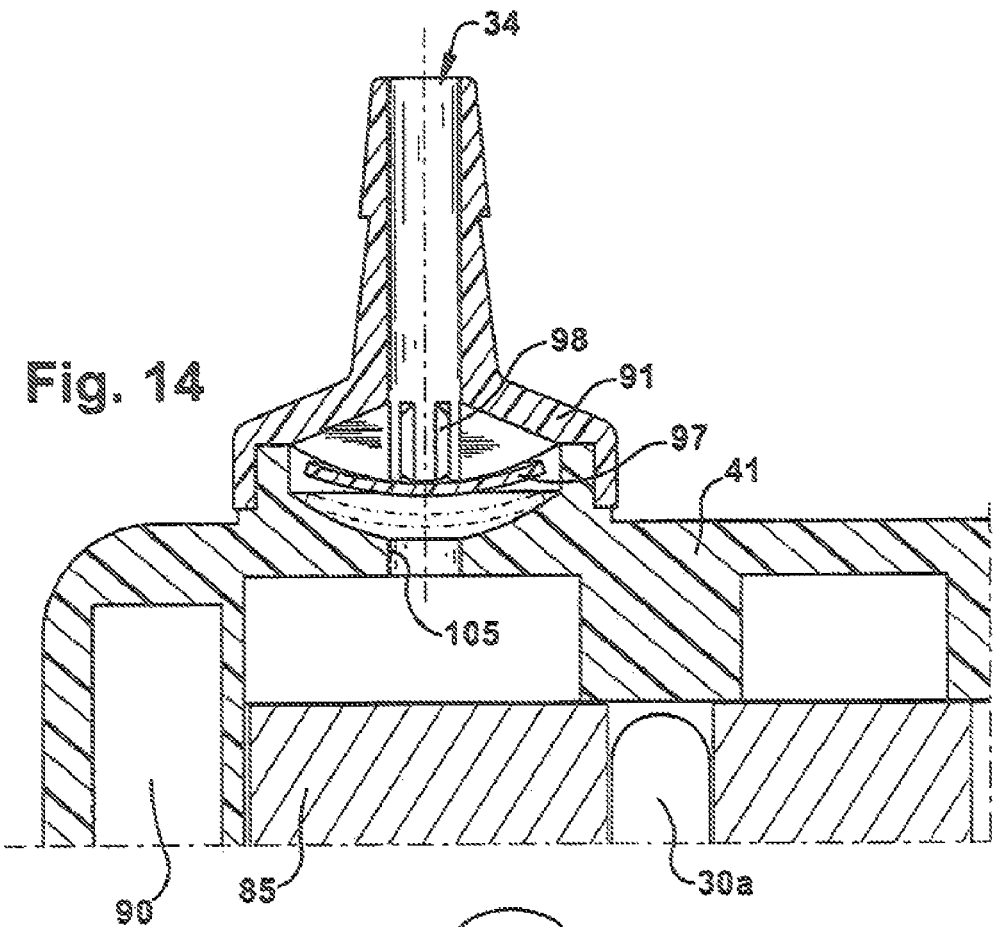
FIGS. 14 and 15 illustrate operation of a check valve for use with the invention.
Figure 15:
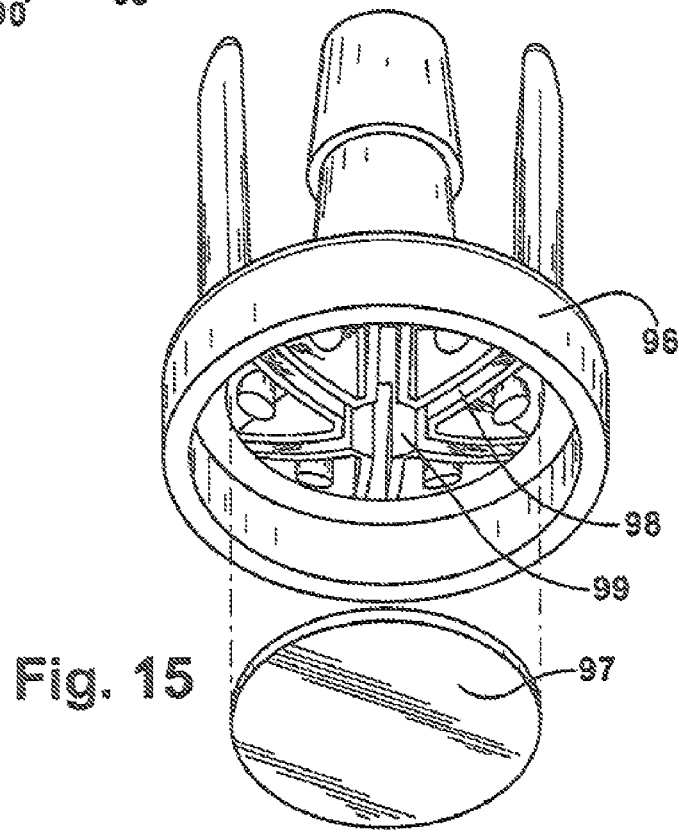
Figure 16:
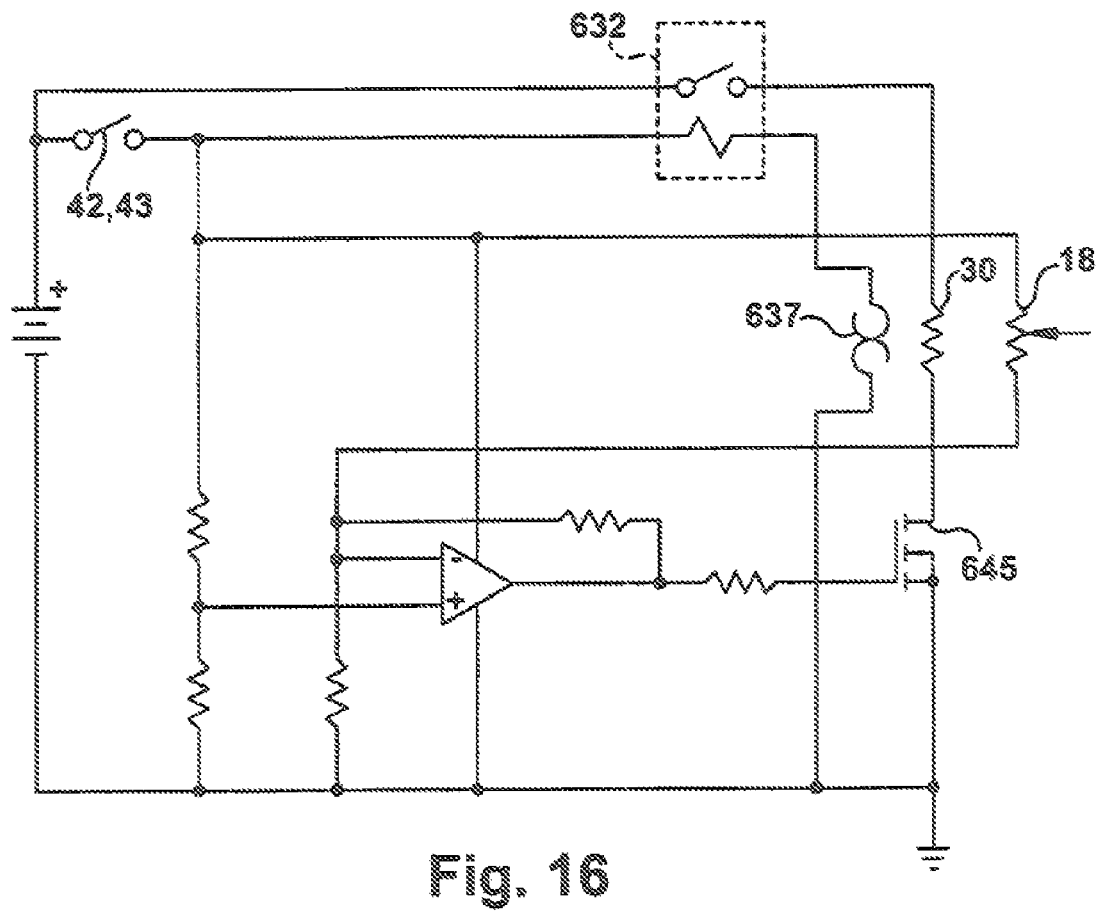
FIGS. 16 and 17 are schematic diagrams of a representative system for use with the present invention as shown FIGS. 9 and 10.
Figure 17:
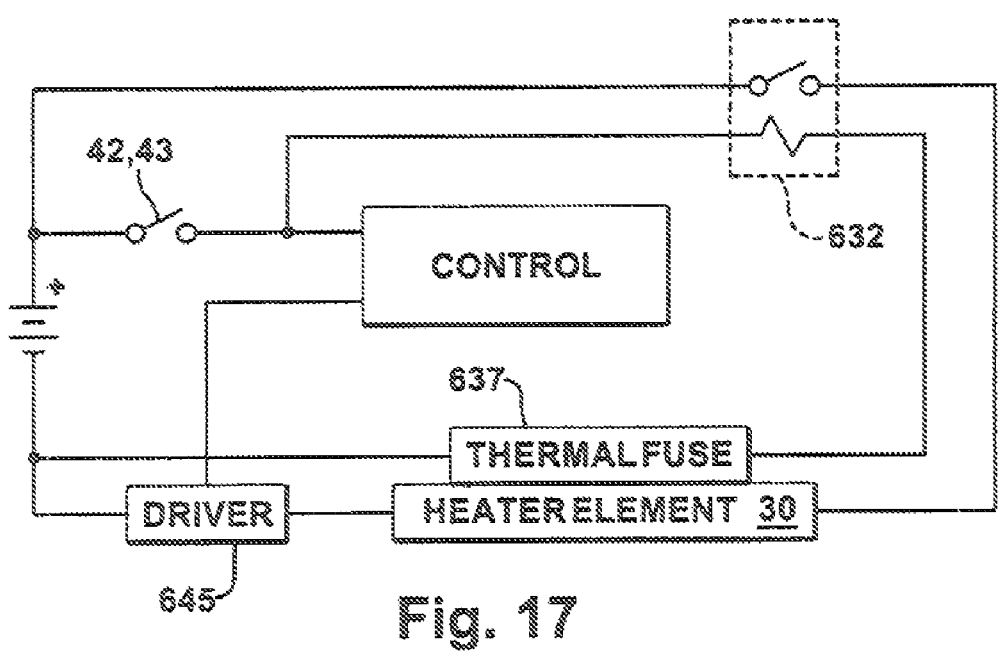

As depicted in FIGS. 14 and 15 the outlet 34 is defined by an end cap 91 and flexible membrane 97 coupled to the housing 41. The end cap includes a center throughpassage 99 that allows fluid to flow out the outlet to the nozzles. As fluid is forced through the reservoir, an elastomeric membrane 97 is forced against radially extending slots 98 which open into a central passageway 99. Once the pressure is removed from the reservoir by deactivating the washer pump the membrane 97 moves from the position shown in FIG. 14 to cover a narrow throughpassageway 105 to prevent fluid from flowing back into the reservoir from the nozzles.

Figure 11:
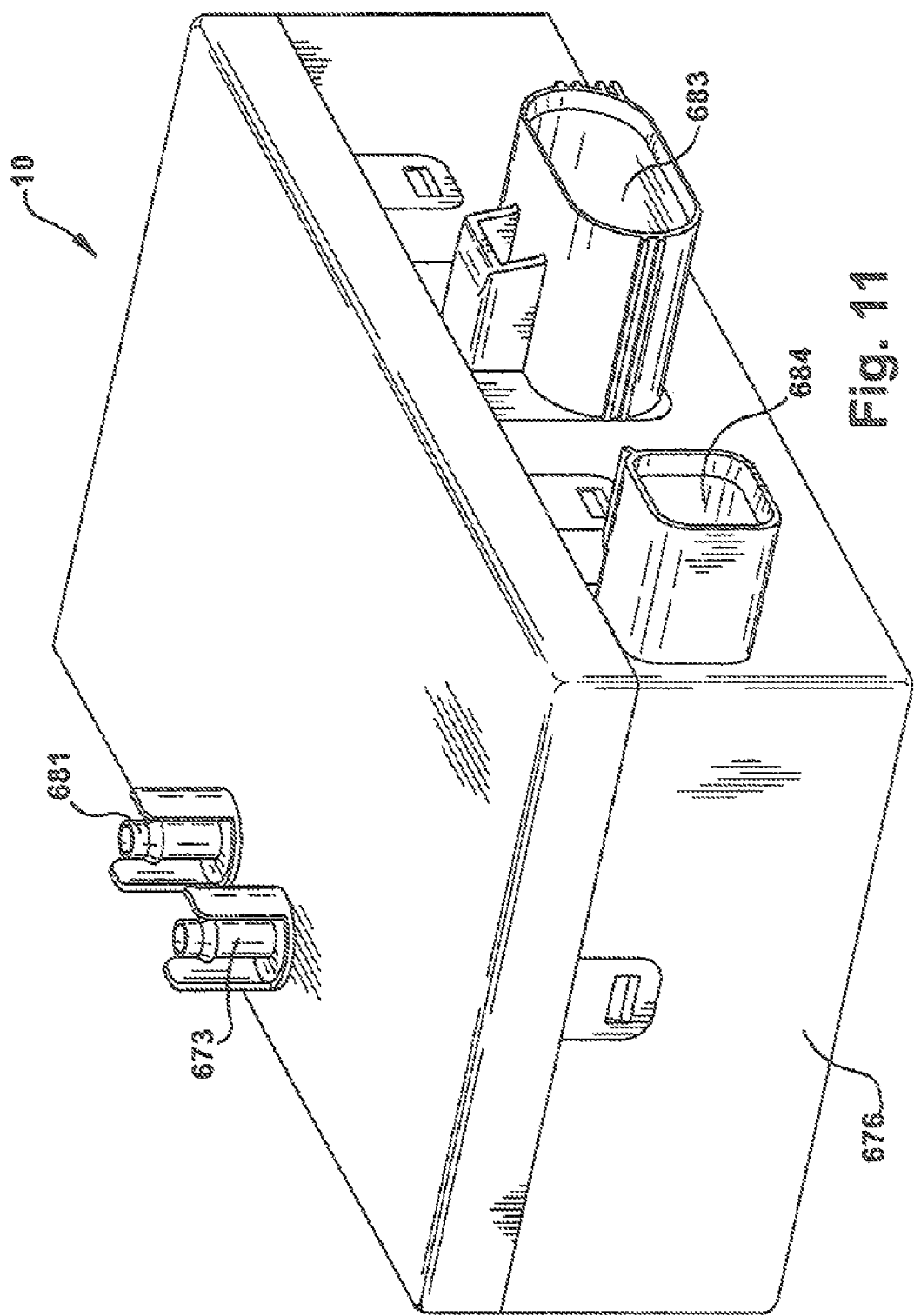
FIGS. 11, 12, and 13 depict an alternate embodiment of a fluid heating system.
Figure 12:
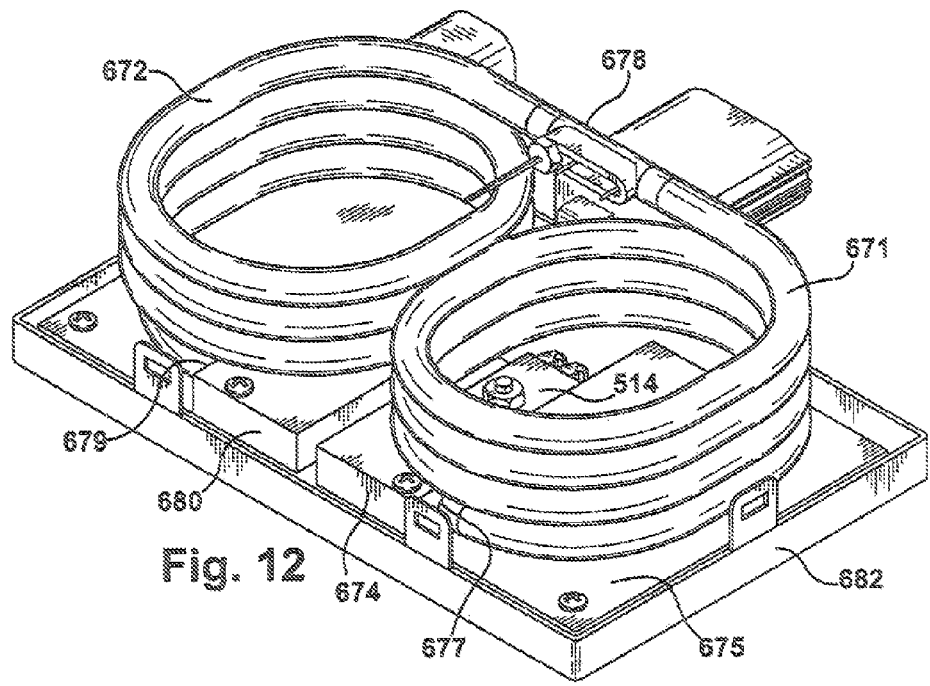
Figure 13:
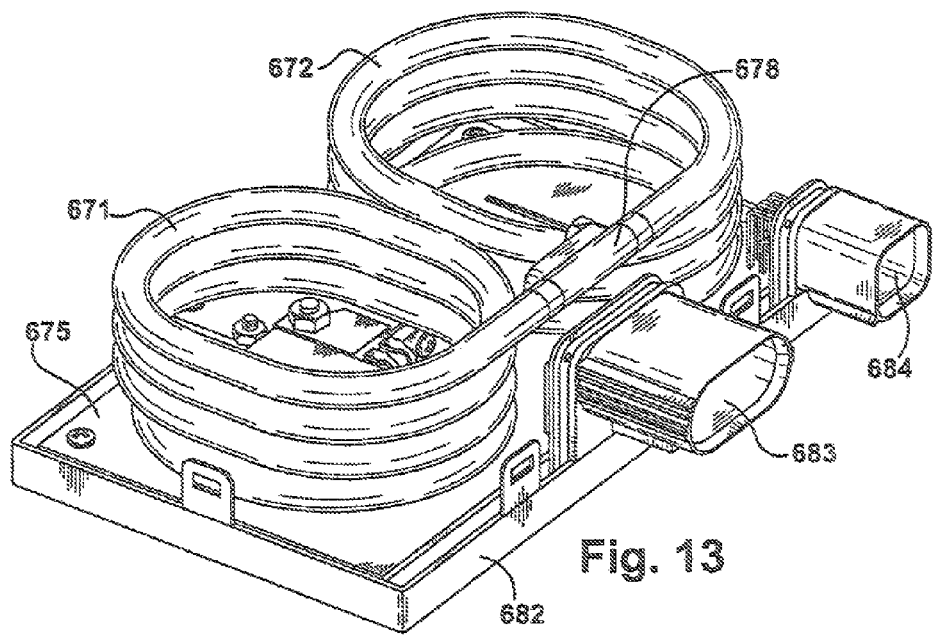

FIGS. 12-13 show the system with a cover component 676 removed. In this embodiment, control system 10 (FIG. 11) receives fluid through an inlet port 681 that then enters into a heatsink 674. A previously described power FET component is electrically and mechanically attached to printed circuit board (PCB) 675, using well known methods, and is joined with heatsink 674 by means of a threaded fastener or the like. The heatsink 674 is preferably made from copper, or alloy materials such as aluminum that are similarly effective in thermal transfer. The heatsink 674 is configured to contain a small volume of fluid, preferably situated directly opposite the flat mounting surface of a power FET, ideally for the purpose of cooling power FET during system operation. Conversely, heat transferring from power FET 514 through the heatsink 674 serves to heat the fluid in the reservoir area, adding to the performance of control system 10.

A heatsink 674 also provides electrical connection between the PCB 675 and a first heater coil 671 such as a coil that is depicted in U.S. Pat. No. 6,902,118 which is incorporated herein by reference. Fluid passes from heatsink 674 into first heater coil 671 through aperture 677, through temperature sensor fitting 678 and into second heater coil 672. Fluid dispenses into check valve block 680 through an entryway 679 and exits control system 10 by means of outlet port 673. A check valve block 680 also provides electrical connection between PCB 675 and second heater coil 672, and is preferably made from copper, or any alloy material capable of withstanding long term exposure to typical fluids used in vehicle washer systems. The assembly as described is preferably attached to base component 682 and enclosed in the cover 676 (FIG. 11), which are preferably molded from plastic material such as 30% glass reinforced polyester, such as that made by GE Plastics under the trade name Valox®. There are many other suitable materials available capable of withstanding the environment and conditions typical of those under a vehicle engine compartment. Power is supplied to this embodiment of control system 10 by means of a connector assembly 683, while input and output commands are administered by means of a connector assembly 684. Similar connector assemblies are used in the FIGS. 9 and 10 embodiment of the control.

While the invention has been described with a degree of particularity, it is the intent that the invention includes all modifications and alterations from the disclosed design falling within the spirit or scope of the appended claims.

The invention claimed is:

1. A method of providing a heated cleaning fluid to a vehicle surface comprising:
   a) mounting a heater element to a heat exchanger and placing the heat exchanger into a fluid reservoir;
   b) routing fluid into the fluid reservoir through an inlet port in fluid communication with the fluid reservoir;
   b) coupling the fluid reservoir to an outlet port in fluid communication with the fluid reservoir for dispensing an amount of heated fluid;
   d) heating fluid that passes from the inlet to the outlet port through said fluid reservoir by energizing the heater element with a voltage source to heat both the heater element and the heat exchanger as fluid contacts an outer surface of the heat exchanger; and
   e) mounting a thermal sensor to the heat exchanger and sensing the temperature in proximity to the heater element when voltage is applied to the heater element by monitoring an output from the thermal sensor and de-energizing the heater element if a sensed temperature is too high to prevent thermal runaway of the heater element.

2. The method of claim 1 wherein the heater element is energized by a vehicle battery and wherein the energizing is performed by a control circuit and further comprising disconnecting the battery from the heater element with a thermally activated switch in the event of a failure of the control circuit should too high a heater element temperature be sensed.

* * * * *